(12) United States Patent
Murakami et al.

(10) Patent No.: US 7,942,449 B2
(45) Date of Patent: May 17, 2011

(54) SEAT BELT APPARATUS AND SEAT BELT RETRACTOR

(75) Inventors: Daisuke Murakami, Tokyo (JP); Koji Inuzuka, Tokyo (JP); Koji Tanaka, Tokyo (JP); Masato Takao, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/923,585

(22) Filed: Sep. 29, 2010

(65) Prior Publication Data
US 2011/0018330 A1 Jan. 27, 2011

Related U.S. Application Data

(62) Division of application No. 12/216,024, filed on Jun. 27, 2008, now Pat. No. 7,819,430.

(30) Foreign Application Priority Data

Aug. 28, 2007 (JP) .................................. 2007-221360

(51) Int. Cl.
*B60R 22/34* (2006.01)
(52) U.S. Cl. ..................................... 280/807; 242/390.8
(58) Field of Classification Search .................. 280/807; 242/390.8; 297/474, 475
See application file for complete search history.

(56) References Cited

U.S. PATENT DOCUMENTS

| | | | | |
|---|---|---|---|---|
| 4,489,804 A * | 12/1984 | Kamijo | ........................... | 180/268 |
| 4,669,680 A * | 6/1987 | Nishimura et al. | ......... | 242/375.3 |
| 4,787,569 A * | 11/1988 | Kanada et al. | ................ | 242/371 |
| 4,896,844 A * | 1/1990 | Gavagan et al. | .............. | 280/807 |
| 5,765,774 A | 6/1998 | Maekawa et al. | | |
| 6,447,012 B2 | 9/2002 | Peter et al. | | |
| 6,827,308 B2 * | 12/2004 | Fujii et al. | ................... | 242/390.9 |
| 6,908,112 B2 * | 6/2005 | Yano et al. | ..................... | 280/805 |
| 7,080,800 B2 * | 7/2006 | Fujii et al. | ................... | 242/390.9 |
| 7,673,905 B2 * | 3/2010 | Fujii et al. | ..................... | 280/806 |
| 7,793,984 B2 * | 9/2010 | Murakami et al. | ............ | 280/807 |
| 7,819,430 B2 * | 10/2010 | Murakami et al. | ............ | 280/807 |
| 2003/0209900 A1 * | 11/2003 | Tobata | ......................... | 280/807 |
| 2005/0173580 A1 | 8/2005 | Lucht et al. | | |
| 2006/0273212 A1 * | 12/2006 | Mori et al. | ..................... | 242/390.8 |
| 2007/0114775 A1 | 5/2007 | Inuzuka et al. | | |
| 2008/0105777 A1 | 5/2008 | Holbein et al. | | |
| 2008/0174098 A1 * | 7/2008 | Takao et al. | .................... | 280/807 |
| 2008/0231036 A1 * | 9/2008 | Takao et al. | .................... | 280/807 |
| 2008/0238076 A1 * | 10/2008 | Takao et al. | .................... | 280/807 |
| 2009/0058063 A1 * | 3/2009 | Takao et al. | .................... | 280/807 |

FOREIGN PATENT DOCUMENTS

| | | |
|---|---|---|
| DE | 199 61 108 A1 | 6/2001 |
| JP | 8-40204 | 2/1996 |
| JP | 9-272401 | 10/1997 |
| JP | 10-119720 | 5/1998 |

(Continued)

*Primary Examiner* — Paul N Dickson
*Assistant Examiner* — Drew Brown
(74) *Attorney, Agent, or Firm* — Foley & Lardner LLP

(57) ABSTRACT

A seat belt retractor includes a frame having a back plate and a side wall protruding from each of multiple side edges of the back plate. The seat belt retractor also includes a spool supported by the frame and configured to rotate and wind a seat belt, a motor configured to rotate the spool, and an electronic control unit configured to drive and control the motor. The electronic control unit is mounted between the side walls of the frame and the back plate is disposed in an inner space of a vehicle body member and faces a vehicle interior direction.

8 Claims, 8 Drawing Sheets

FOREIGN PATENT DOCUMENTS

| | | |
|---|---|---|
| JP | 2000-135969 | 5/2000 |
| JP | 2001-130377 | 5/2001 |
| JP | 2001-187561 | 7/2001 |
| JP | 2001-199309 | 7/2001 |
| JP | 2005-527427 | 9/2005 |
| JP | 2007-145079 | 6/2007 |

* cited by examiner

SEAT BELT APPARATUS AND SEAT BELT RETRACTOR

CROSS REFERENCE TO RELATED APPLICATIONS

This application is a Divisional of U.S. application Ser. No. 12/216,024, filed Jun. 27, 2008, which is incorporated herein by reference in its entirety

BACKGROUND

The present disclosure generally relates to a seat belt apparatus or a seat belt retractor that carries out at least one of retracting and withdrawing operations for a seat belt by rotating a spool with an electric motor. More specifically, the disclosure relates to a seat belt apparatus or a seat belt retractor where the electric motor is controlled by an electronic control unit (ECU).

A conventional seat belt apparatus mounted on a motor vehicle (e.g., an automobile) is configured to restrain an occupant with a seat belt so he or she does not leave a seat during an event such as a collision of a motor vehicle, hard braking, etc. The seat belt apparatus includes a seat belt retractor for retracting the seat belt. A conventional seat belt retractor winds the seat belt on a spool when the seat belt is not worn and also allows the seat belt to be withdrawn and worn by the occupant. The seat belt retractor typically includes a locking mechanism that activates during an event to block rotation of the spool in a withdrawing direction so the seat belt cannot be withdrawn and so the occupant is restrained.

SUMMARY

One embodiment of the disclosure relates to a seat belt retractor including a frame having a back plate and a side wall protruding from each of multiple side edges of the back plate. The seat belt retractor also includes a spool supported by the frame and configured to rotate and wind a seat belt, a motor configured to rotate the spool, and an electronic control unit configured to drive and control the motor. The electronic control unit is mounted between the side walls of the frame and the back plate is disposed in an inner space of a vehicle body member and faces a vehicle interior direction.

Another embodiment of the disclosure relates to a seat belt retractor including a frame having a back plate and a side wall protruding from each of multiple side edges of the back plate. The seat belt retractor also includes a spool supported by the frame and configured to rotate and wind a seat belt, a motor configured to rotate the spool, and an electronic control unit configured to drive and control the motor. The motor is mounted between the side walls and the electronic control unit is fixed to the motor. The back plate is disposed in an inner space of a vehicle body member and faces a vehicle interior direction.

BRIEF DESCRIPTION OF THE DRAWINGS

The features, aspects, and advantages of the present disclosure will become apparent from the following description, appended claims, and the accompanying exemplary embodiments shown in the drawings, which are briefly described below.

DETAILED DESCRIPTION

According to various exemplary embodiments, a seat belt retractor may suppress noise caused by a motor and an electronic control unit from affecting other electronic parts in the vehicle even when the motor and the electronic control unit are integrally provided in a seat belt retractor. The seat belt retractor may also be more compact than a conventional retractor to improve ease of installation, removal, and maintenance.

Figure 7:
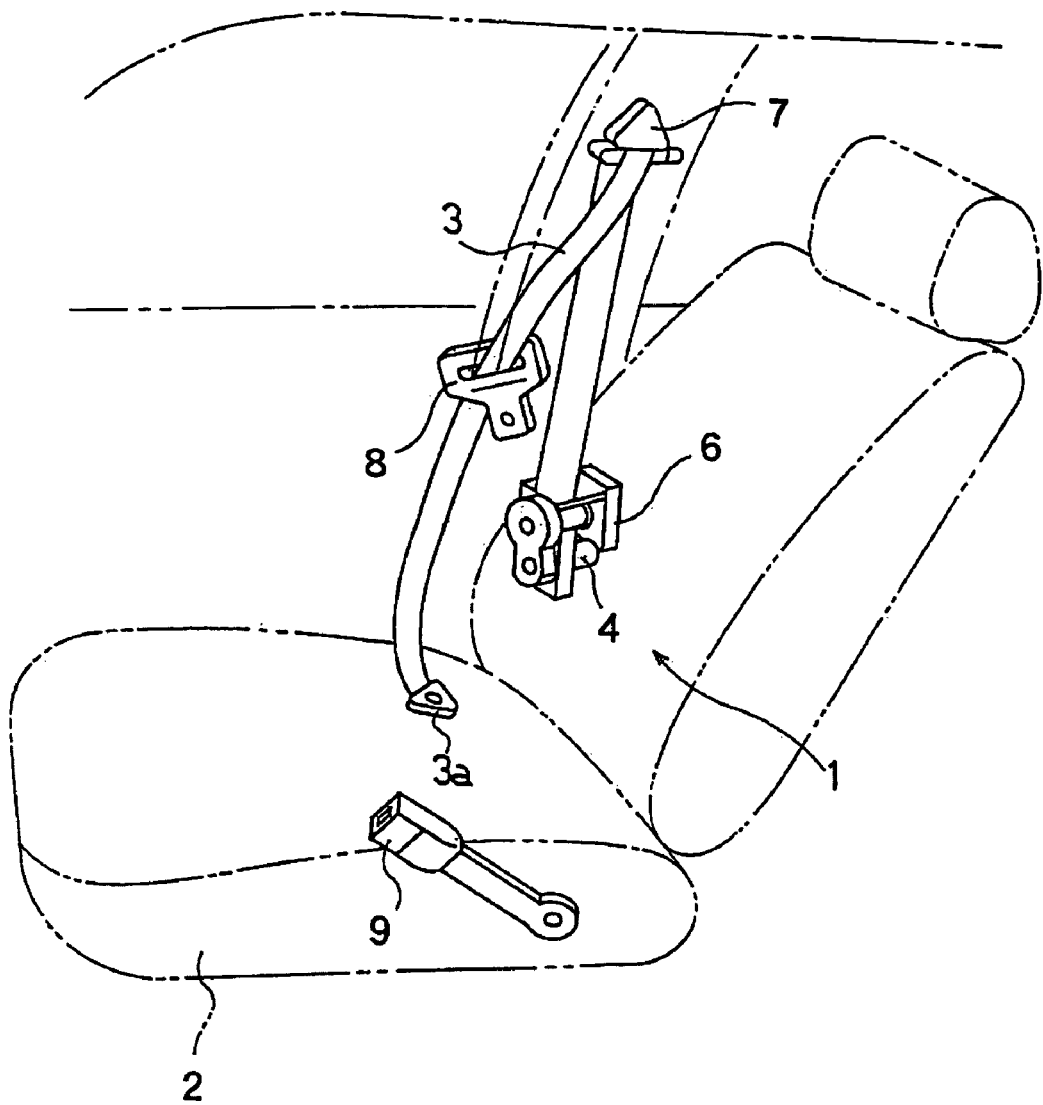
FIG. 7 is a schematic view illustrating a seat belt apparatus according to an exemplary embodiment.
Figure 8:
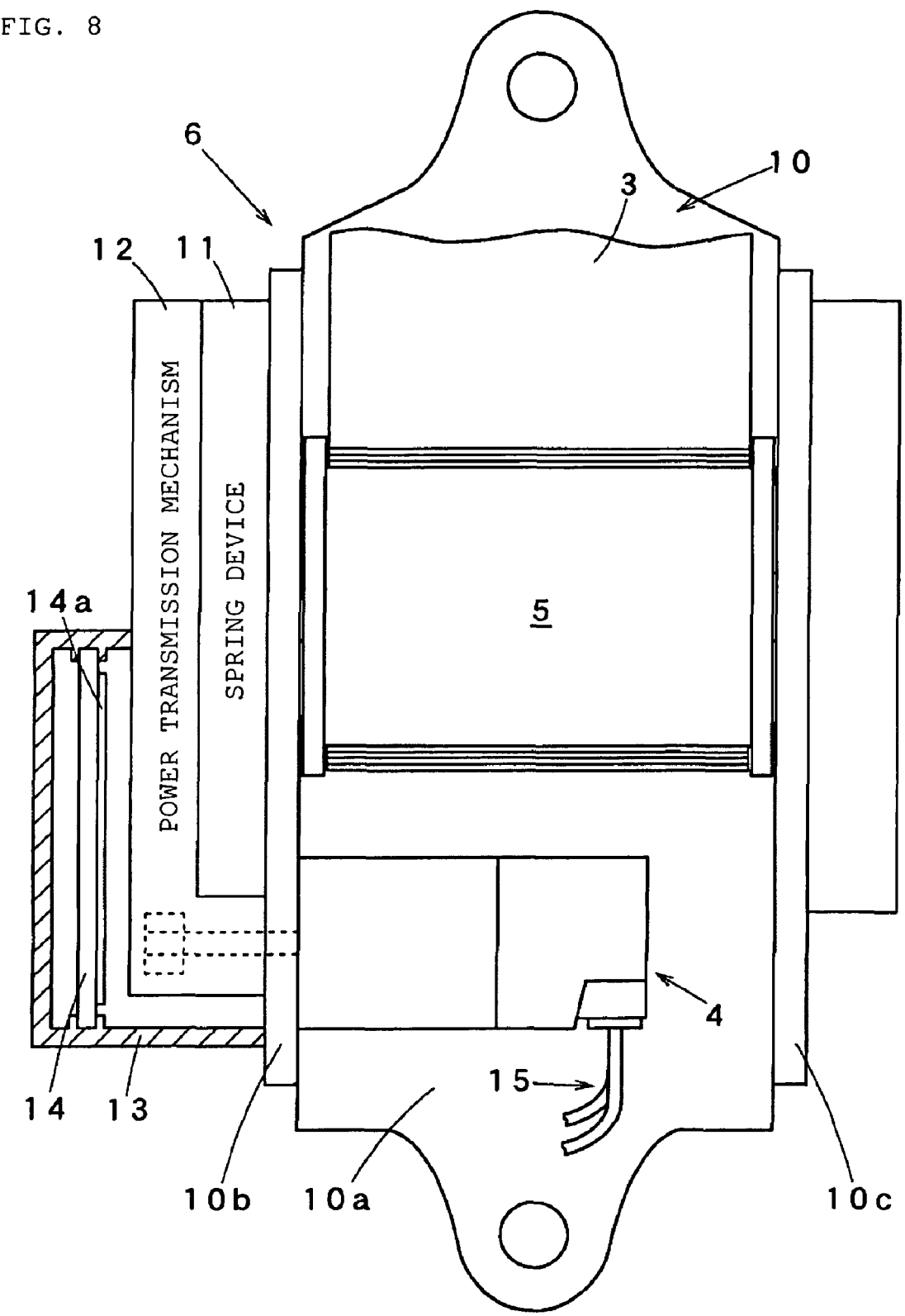
FIG. 8 is a schematic view illustrating a seat belt retractor used in the seat belt apparatus illustrated in FIG. 7 according to an exemplary embodiment.

FIG. 7 is a schematic view illustrating a seat belt apparatus according to an exemplary embodiment and FIG. 8 is a schematic view illustrating a seat belt retractor used in the seat belt apparatus.

As illustrated in FIGS. 7 and 8, a seat belt apparatus 1 may be a three-point type seat belt apparatus and includes a seat belt 3, a belt anchor 3a, a seat belt retractor 6, a guide anchor 7, a tongue 8, and a buckle 9. The belt anchor 3a at a tip end of the seat belt 3 is fixed to a vehicle body floor or a vehicle seat 2. The seat belt retractor 6 is fixed to a vehicle body and retracts the seat belt 3 by rotating a spool 5 with an electric motor 4. The guide anchor 7 guides the seat belt 3 as it is withdrawn from the seat belt retractor 6 toward a shoulder of the occupant. The tongue 8 is slidably supported by the seat belt 3. The buckle 9 is fixed to the vehicle body floor or the vehicle seat 2 and the tongue 8 is inserted and engaged or removed and disengaged.

The seat belt retractor 6 includes a C-shaped frame 10 having a back plate 10a, a left side wall 10b, and a right side wall 10c. The left and right sidewalls 10b, 10c protrude from the left and right sides of the back plate 10a. The seat belt retractor 6 receives the seat belt 3 and the spool 5 is supported by the frame 10 and rotates to retract the seat belt 3. The seat belt retractor 6 includes a spring device 11 that is supported by the frame 10 and biases the spool 5 in a seat belt-retracting direction. The motor 4 drives or rotates the spool 5 and is supported by the frame 10. A power transmission mechanism 12 is supported by the frame 10, transmits power from the motor 4 to the spool 5, and converts the speed of the motor 4. A circuit board 14 is supported by a cover 13 on a side wall 10b at a left side of the frame 10 and includes a printed circuit 14a for driving and/or controlling the motor 4. The printed circuit 14a of the circuit board 14 is electrically connected to the motor 4 and a power source.

A vehicle sensor (e.g., a deceleration sensing mechanism) may be activated when a predetermined deceleration threshold is reached or surpassed by the motor vehicle (e.g., a collision, hard braking, etc.). A webbing sensor may be activated when the worn seat belt 3 is rapidly withdrawn at a speed higher than a typical withdrawal speed of the seat belt 3. A locking mechanism for locking the rotation of the spool 5 in a seat belt-withdrawing direction may be provided in the right side wall 10c of the frame 10 and may be activated by the activation of any one of the vehicle sensor or the webbing sensor.

Seat belt retractors are generally disposed in a narrow space inside a vehicle, for example a space inside a center pillar or the like. A vehicle body may include an opening (e.g., in the center pillar, etc.) for installing or removing the seat belt retractor.

According to an exemplary embodiment, the circuit board 14 may be attached to the seat belt retractor 6. The motor 4 and circuit board 14 may generate noise when the circuit board 14 is active and the motor 4 is actuated. It is preferred that other electronic parts of the motor vehicle not be affected by the noise generated from the motor 4 and the circuit board 14.

When the circuit board 14 is attached to the seat belt retractor 6, the strength of the frame 10 should be sufficient to mount and protect the circuit board 14. Strengthening the frame 10 typically increases the wall thickness of the frame 10 or the structural size of the frame may increase or include more parts, increasing the size of the seat belt retractor 6. The size of the seat belt retractor 6 may also increase to accommodate the size of the circuit board 14. A larger sized seat belt retractor 6 may be more difficult to assemble or service in the limited narrow space inside the motor vehicle (e.g., the inner space of the center pillar).

According to various exemplary embodiments, the seat belt retractor may be capable of suppressing noise so the noise does not other electronic parts, even when the electronic control unit is attached to the motor. Further, the seat belt retractor may be compact to improve assembly, installation, or servicing of the retractor or seat belt apparatus.

According to an exemplary embodiment, a seat belt retractor including a frame having a back plate and a side wall protruding from each of multiple side edges of the back plate. The seat belt retractor also includes a spool supported by the frame and configured to rotate and wind a seat belt, a motor configured to rotate the spool, and an electronic control unit configured to drive and control the motor. The electronic control unit is installed or mounted between the side walls of the frame and the back plate is disposed in an inner space of a vehicle body member and faces a vehicle interior direction.

According to an exemplary embodiment, the electronic control unit is mounted between side end edges of the side walls and the motor is disposed below or above the side walls of the frame.

According to an exemplary embodiment, the electronic control unit is mounted between lower edges of the side walls and the motor is fixed to a lower surface of the electronic control unit.

According to an exemplary embodiment, the electronic control unit is mounted between upper edges of the side walls and the motor is fixed to an upper surface of the electronic control unit.

According to an exemplary embodiment, a seat belt apparatus includes the seat belt retractor for performing at least one of retracting and withdrawing operations for a seat belt by rotating a spool with a motor. The seat belt apparatus also includes a tongue slidably supported by the seat belt and a buckle with which the tongue is disengaged or engaged. An occupant may be restrained by the seat belt when the tongue is engaged with the buckle.

According to another exemplary embodiment, a seat belt retractor including a frame having a back plate and a side wall protruding from each of multiple side edges of the back plate. The seat belt retractor also includes a spool supported by the frame and configured to rotate and wind a seat belt, a motor configured to rotate the spool, and an electronic control unit configured to drive and control the motor. The motor is mounted between the side walls and the electronic control unit is fixed to the motor. The back plate is disposed in an inner space of a vehicle body member and faces a vehicle interior direction.

According to another exemplary embodiment, the motor is mounted between lower edges of the side walls and the electronic control unit is fixed to a lower surface of the motor.

According to another exemplary embodiment, the motor is mounted between upper edges of the side walls and the electronic control unit is fixed to an upper surface of the motor.

According to various exemplary embodiments, noise can be shielded by a vehicle body member (e.g., a center pillar) and the back plate of a frame even when the electronic control unit is activated at the same time a motor is actuated because the electronic control unit is mounted at the side walls of a frame and is covered with a vehicle body member (e.g., a center pillar or the like) and a back plate of the frame. Therefore, the possibility that noise is leaked outside the inner space of the vehicle body member is reduced and the noise can be suppressed affecting other electronic parts of the motor vehicle.

The electronic control unit can be used as a reinforcing member for the frame because the electronic control unit is attached to a surface of the back plate facing the vehicle interior at a position facing both side walls of the frame (as compared with when the electronic control unit is provided on one of the side walls). Thus the strength of the frame can be increased without increasing the wall thickness of the frame or complicating or enlarging the structural size of the frame. Even when the electronic control unit is attached to the seat belt retractor, the seat belt retractor can be lightweight and compact. Assembly and servicing of the seat belt retractor in the limited narrow space inside the motor vehicle (e.g., an inner space of the center pillar, etc.) may be easier.

The electronic control unit may be attached to the back plate at a position facing both side walls of the frame allowing the electronic control unit to function as a counter weight to suppress vibration of the seat belt retractor.

The electronic control unit may be provided at the same side (vehicle exterior direction side) as that of the motor in relation to the back plate of the frame allowing the electronic control unit to be placed closer to the motor. Thus the seat belt retractor can be more compact and an electric connection between the electronic control unit and the motor can be simplified.

The electronic control unit may be disposed between the frame and the motor, the electronic control unit may be protected from an external force by the frame and the motor.

The motor and the electronic control unit may be attached to each other allowing the electric connection between the electronic control unit and the motor to be simplified, the length of the wiring to be reduced, and assembly of the seat belt retractor (including the motor and the electronic control unit) to take less time. Because both of the motor and the electronic control unit are disposed below or above the side walls of the frame, dead spaces of the side walls can be more effectively utilized to mount the motor and the electronic control unit.

The electronic control unit and the motor may bee mounted at an upper part of the side walls allowing the electronic control unit and motor to be placed closer an upper side of the retractor frame for mounting to a position of the vehicle body. Even when the electronic control unit is attached to the motor in the seat belt retractor, the weight of the electronic control unit and the motor may be dispersed to the side walls of the frame and to the upper side of the frame.

The electronic control unit may be surrounded by the back plate, side walls, and the upper part of the frame and so the electronic control unit can be protected from the external force by the back plate, side walls, and upper part of the frame.

According to other exemplary embodiments, an inner space of a vehicle interior may be less wastefully occupied by the seat belt retractor even when the seat belt retractor includes the electronic control unit attached to the motor because the seat belt retractor may be compact and capable of being assembled in a narrow space of the vehicle body (e.g., an inner space of the center pillar). The restraining capability for an occupant can be adjusted by a belt tension control for the seat belt with the motor while maintaining occupant comfort.

Figure 1:
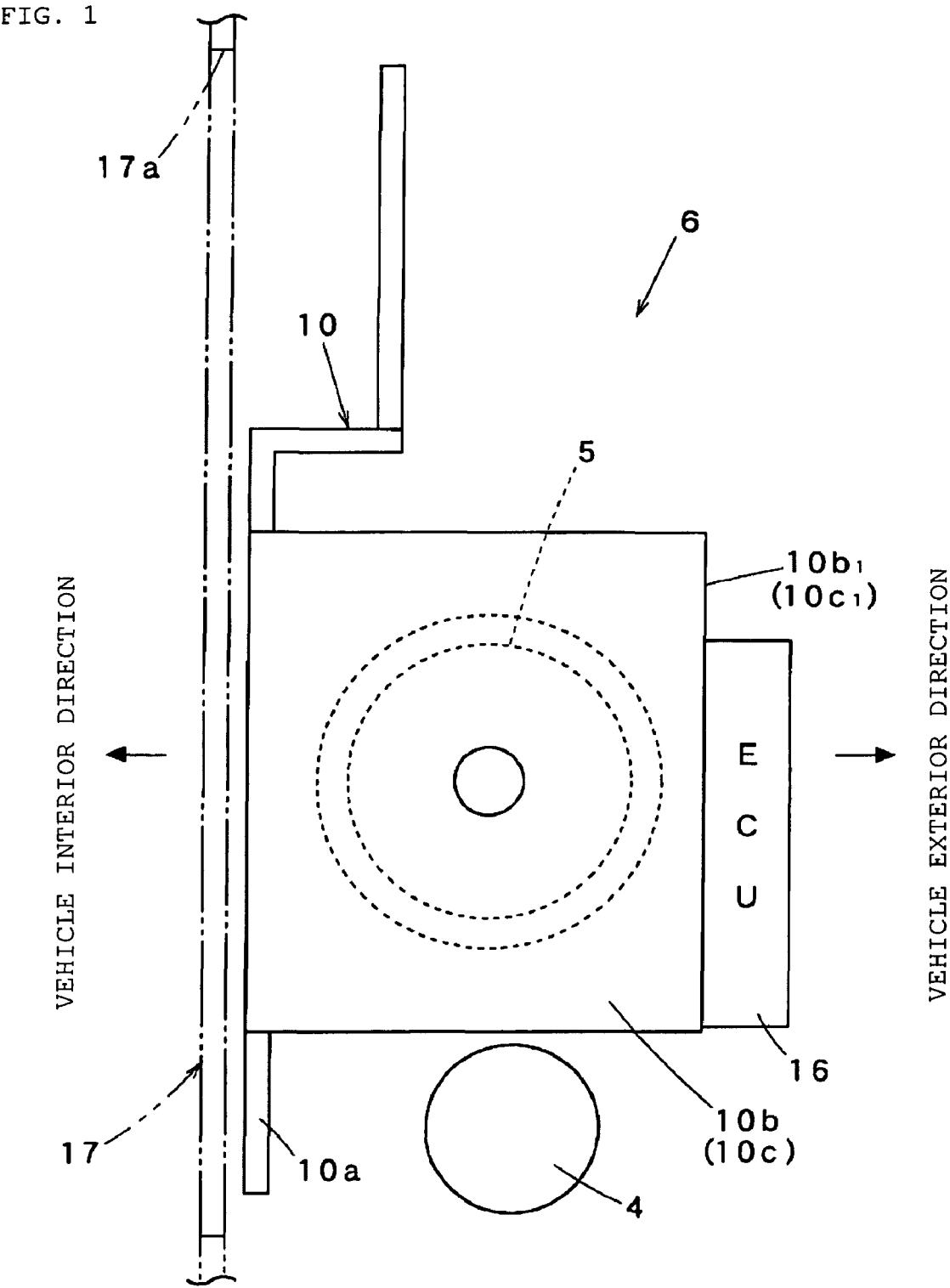
FIG. 1 is a schematic view illustrating a seat belt retractor according to an exemplary embodiment.

FIG. 1 is a schematic view illustrating an exemplary embodiment of a seat belt retractor. In the description of the respective exemplary embodiments below, the same reference numerals used in reference to the same components as that of FIG. 1 and a detailed explanation for the components is omitted.

As illustrated in FIG. 1, a seat belt retractor 6 of the first example includes a metal C-shaped frame 10 and a spool 5 supported by the frame 10 and rotating to wind a seat belt 3. The seat belt retractor 6 includes an electric motor 4 for rotating the spool 5 in both a belt-retracting direction and a belt-withdrawing direction and a generally flat plate-shaped electronic control unit (ECU) 16 for driving and controlling the motor 4. The seat belt retractor 6 is configured to perform both retracting and withdrawing operations for the seat belt 3 using a driving force of the motor 4.

The motor 4 is disposed at the same side of a back plate 10a as the spool 5 and is below side walls 10b and 10c of the frame 10 (since the side wall 10c is visually overlapped with the side wall 10b, only the reference numeral is shown in brackets). The motor 4 is detachably fixed to at least one of the back plate 10a, side wall 10b, and side wall 10c so that a longitudinal direction of the motor 4 (e.g., an axial direction of a rotation shaft of the motor 4) is parallel to an axial direction of the spool 5.

The ECU 16 is mounted between side end edges 10b1 and 10c1 of the side walls 10b and 10c opposite a side of the back plate 10a. The ECU 16 is detachably attached to a lower portion of the side end edges 10b1 and 10c1 that is situated nearest the motor 4. Therefore, a length of the wiring for an electric connection of the ECU 16 and the motor 4 can be reduced and the ECU 16 and motor 4 may be more easily electrically connected. The motor 4 and the ECU 16 are attached to each other or integrally formed in the seat belt retractor 6. Other constructions of the seat belt retractor 6 of may be substantially the same as that of the exemplary embodiment illustrated in FIG. 8.

The constructed seat belt retractor 6 may be disposed at, for example, an inner space formed from a metal center pillar 17 (corresponding to a vehicle body member), namely a side of a vehicle exterior of the center pillar 17 so that the back plate 10a faces a vehicle interior direction as illustrated in FIG. 1. Most parts of the seat belt retractor 6 to which the ECU 16 is attached are covered with the center pillar 17. The ECU 16 is configured to face the vehicle exterior direction where the seat belt retractor 6 is attached to the vehicle body. Both of the motor 4 and the ECU 16 are covered with the center pillar 17 and the back plate 10a and little of the motor 4 or ECU 16 is directly exposed to the vehicle interior. The seat belt retractor 6 may be removed or installed in the inner space of the center pillar 17 through an opening 17a.

Both the motor 4 and the ECU 16 are covered with the center pillar 17 and the back plate 10a and thus noise can be shielded by the center pillar 17 and the back plate 10a even when the noise is generated from an active ECU 16 and actuated motor 4. The amount of noise leaked out of the inner space of the center pillar 17 is reduced and can be suppressed from affecting other electronic parts of the motor vehicle.

The ECU 16 is mounted between the side end edges 10b1 and 10c1 of the respective side walls 10b and 10c of the frame 10. The ECU 16 can be used as a reinforcing member for the frame 10 (in comparison with when the ECU 16 is attached on only one the side walls 10b and 10c). Therefore, the strength of the frame 10 can be increased without increasing the wall thickness, size, or complexity of the frame 10. Even when the ECU 16 is attached to the seat belt retractor 6, the seat belt retractor 6 can be lightweight and compact improving the ease of assembly or service of the seat belt retractor 6 in the limited narrow space inside the motor vehicle (e.g., an inner space of the center pillar 17).

The ECU 16 is mounted between the side end edges 10b1 and 10c1 of the respective side walls 10b and 10c of the frame 10 and can function as a counterweight to suppress vibration of the seat belt retractor 6.

The ECU 16 is installed at the same side of the back plate 10a (vehicle exterior direction side) as the motor 4 and so the ECU 16 can be placed closer to the motor 4. The seat belt retractor 6 can be more compact and the electric connection between the ECU 16 and the motor 4 can be simplified. Other operation and advantages of the seat belt retractor 6 may be substantially similar to those of the exemplary embodiment illustrated in FIG. 8.

Figure 2:
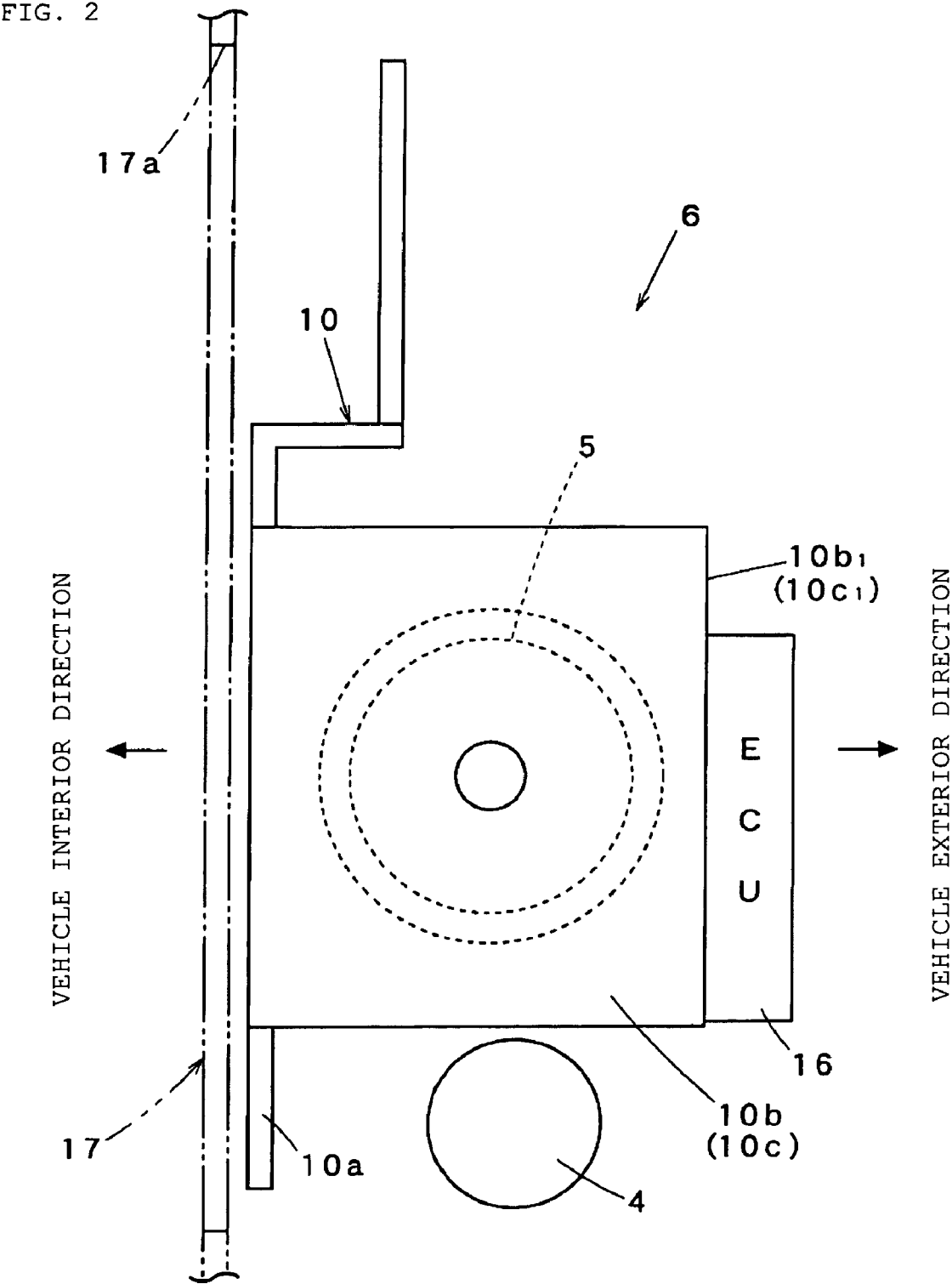
FIG. 2 is a schematic view illustrating a seat belt retractor according to another exemplary embodiment.

FIG. 2 is a schematic view illustrating another exemplary embodiment of the seat belt retractor. Although the motor 4 is disposed below both side walls 10b and 10c in FIG. 1, the motor 4 may be disposed above both side walls 10b and 10c in the seat belt retractor 6 according to other exemplary embodiments. The motor 4 may be fixed to at least one of the back plate 10a, the side wall 10b, and the side wall 10c. The ECU 16 is detachably attached to an upper part of the frame 10 situated nearer the motor 4 between the side end edges 10b1 and 10c1. The motor 4 is disposed at an upper part of the side walls 10b and 10c. Other construction, operation, and advantages of the seat belt retractor may be substantially similar to those of the exemplary embodiment illustrated in FIG. 1.

Figure 3:
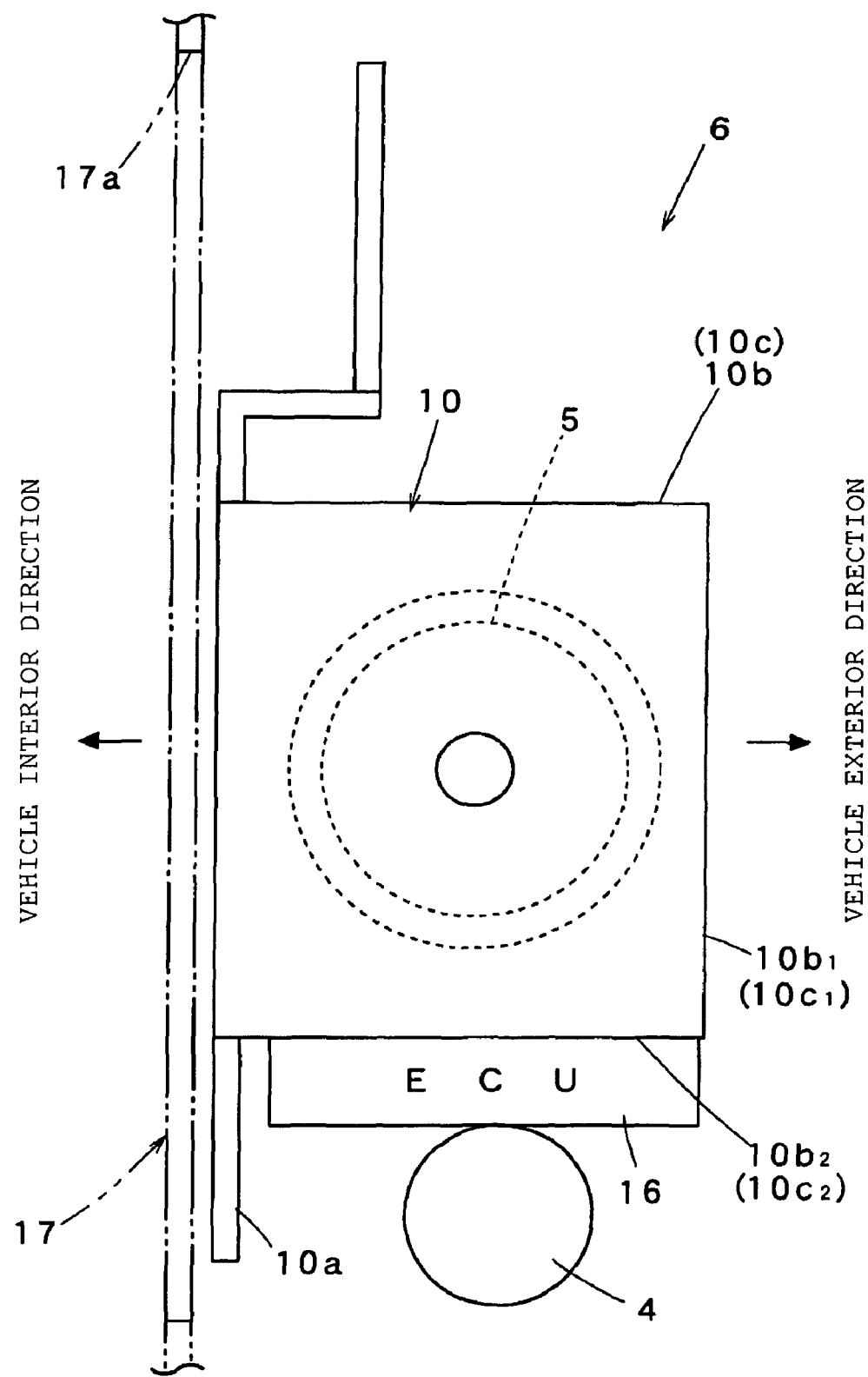
FIG. 3 is a schematic view illustrating a seat belt retractor according to another exemplary embodiment.

FIG. 3 is a schematic view illustrating another exemplary embodiment of the seat belt retractor. Although the ECU 16 is mounted between the side end edges 10b1 and 10c1 of the respective both side walls 10b and 10c in FIG. 1, according to other exemplary embodiments the ECU 16 may be mounted between lower edges 10b2 and 10c2 of side walls 10b and 10c. The motor 4 is fixed to a lower surface of the case of the ECU 16. The ECU 16 is disposed between the frame 10 and the motor 4 and the ECU 16 can be protected from an external force by means of the frame 10 and the motor 4.

The motor 4 and the ECU 16 are attached to each other or integrally formed and so the electric connection between the ECU 16 and the motor 4 may be further simplified reducing the length of the wiring between them. The amount of time needed to assemble, install, or service the motor 4 and the ECU 16 can also be reduced. The motor 4 and the ECU are both disposed below both side walls 10b and 10c of the frame 10 more effectively utilizing dead spaces of the side walls 10b and 10c. Other construction, operation, and advantages of the seat belt retractor may be substantially similar to those of the exemplary embodiment illustrated in FIG. 1.

Figure 4:
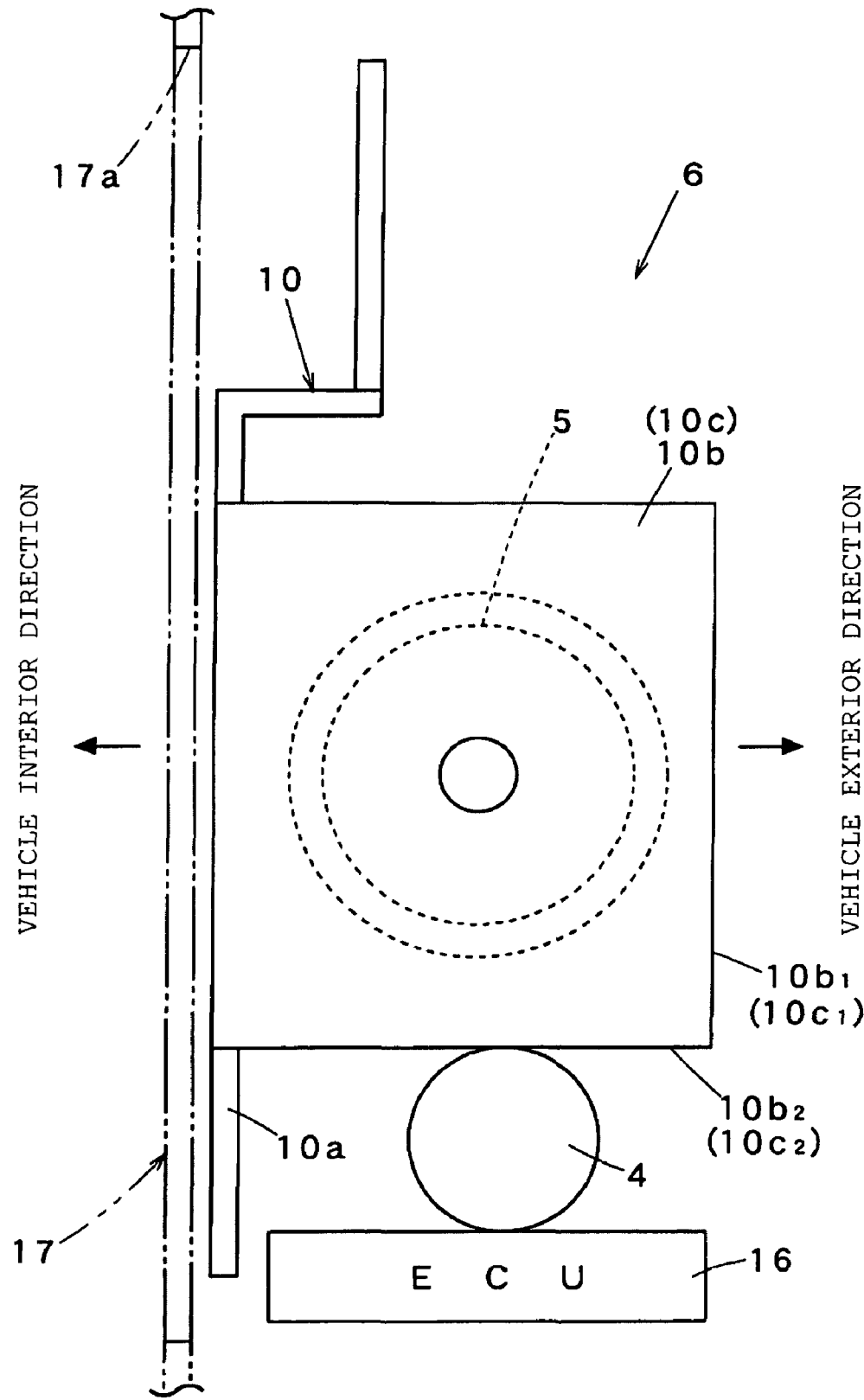
FIG. 4 is a schematic view illustrating a seat belt retractor according to another exemplary embodiment.

FIG. 4 is a schematic view illustrating another exemplary embodiment of the seat belt retractor. Although the ECU 16 is mounted between the lower edges 10b2 and 10c2 of both side walls 10b and 10c of the frame 10 and the motor 4 is fixed to the lower surface of the case of the ECU 16 in the exemplary embodiment of FIG. 3, the motor 4 may be mounted between the lower edges 10b2 and 10c2 and the ECU 16 can be fixed to a lower surface of a case of the motor 4 according to other exemplary embodiments. Other construction, operation, and advantages of the seat belt retractor may be substantially similar to those of the exemplary embodiment illustrated in FIG. 3.

Figure 5:
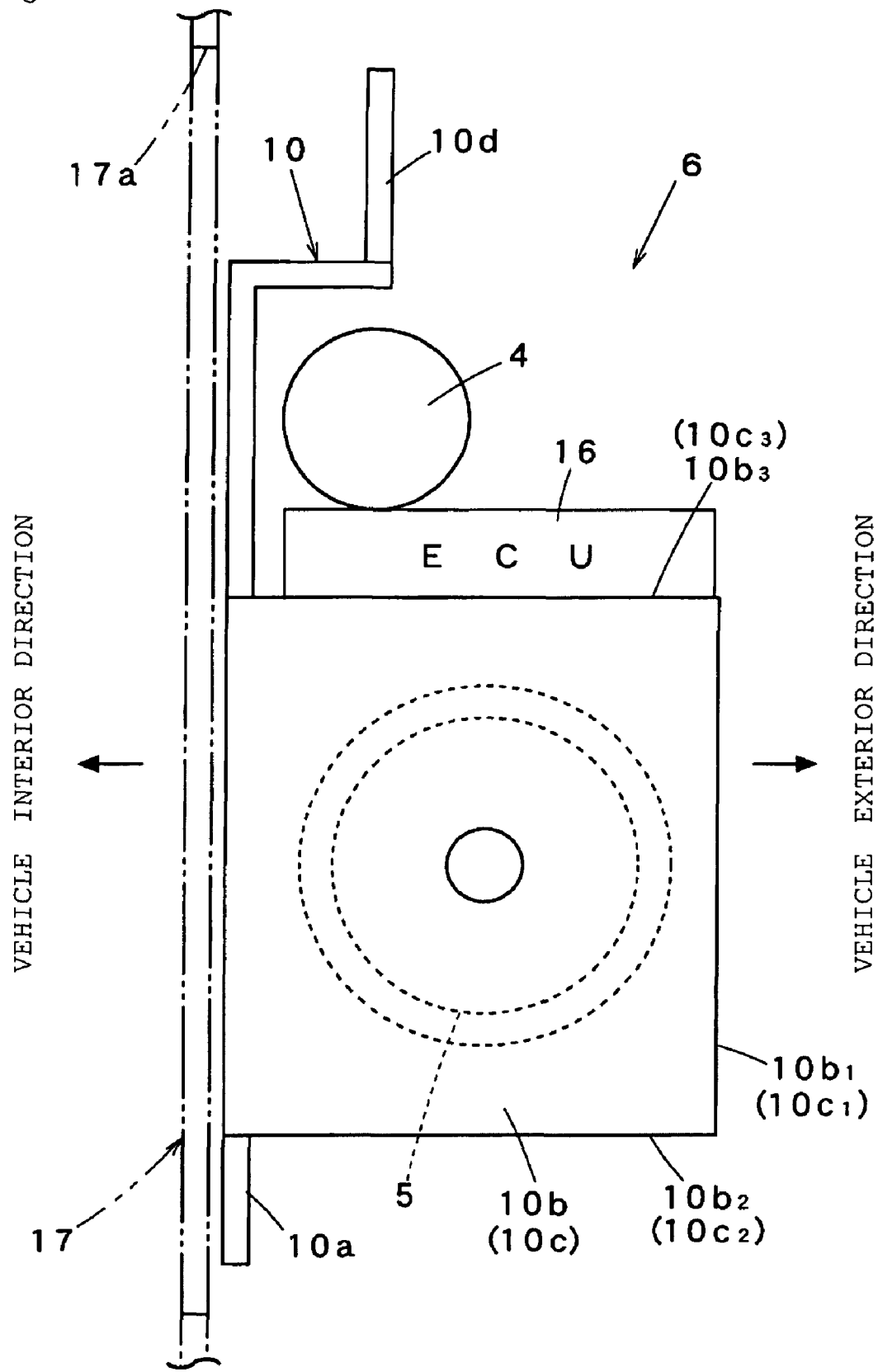
FIG. 5 is a schematic view illustrating a seat belt retractor according to another exemplary embodiment.

FIG. 5 is a schematic view illustrating another exemplary embodiment of the seat belt retractor. Although the ECU 16 is mounted between the lower edges 10b2 and 10c2 and the motor 4 is fixed to the lower surface of the case of the ECU 16 in the exemplary embodiment of FIG. 3, the ECU 16 can be mounted between the upper edges 10b3 and 10c3 of both side walls 10b and 10c and the motor 4 can be fixed to an upper surface of the case of the ECU 16 according to other exemplary embodiments.

The ECU 16 and the motor 4 are provided at an upper portion 10d of the frame 10 that is attached to the vehicle body and so the ECU 16 and the motor 4 can be placed closer to the position the retractor is attached to the vehicle body. Even when the ECU 16 and the motor 4 are attached to each other in the seat belt retractor 6 the weight of the ECU 16 and the motor 4 may be dispersed to both side walls 10b and 10c and to the upper portion 10d.

The ECU 16 is surrounded by the back plate 10a, side walls 10b and 10c, and the upper portion 10d of the frame 10 allowing the ECU 16 to be protected from an external force by the back plate 10a, side walls 10b and 10c, and the upper portion 10d. Other construction, operation, and advantages of the seat belt retractor may be substantially similar to those of the exemplary embodiment illustrated in FIG. 3.

Figure 6:
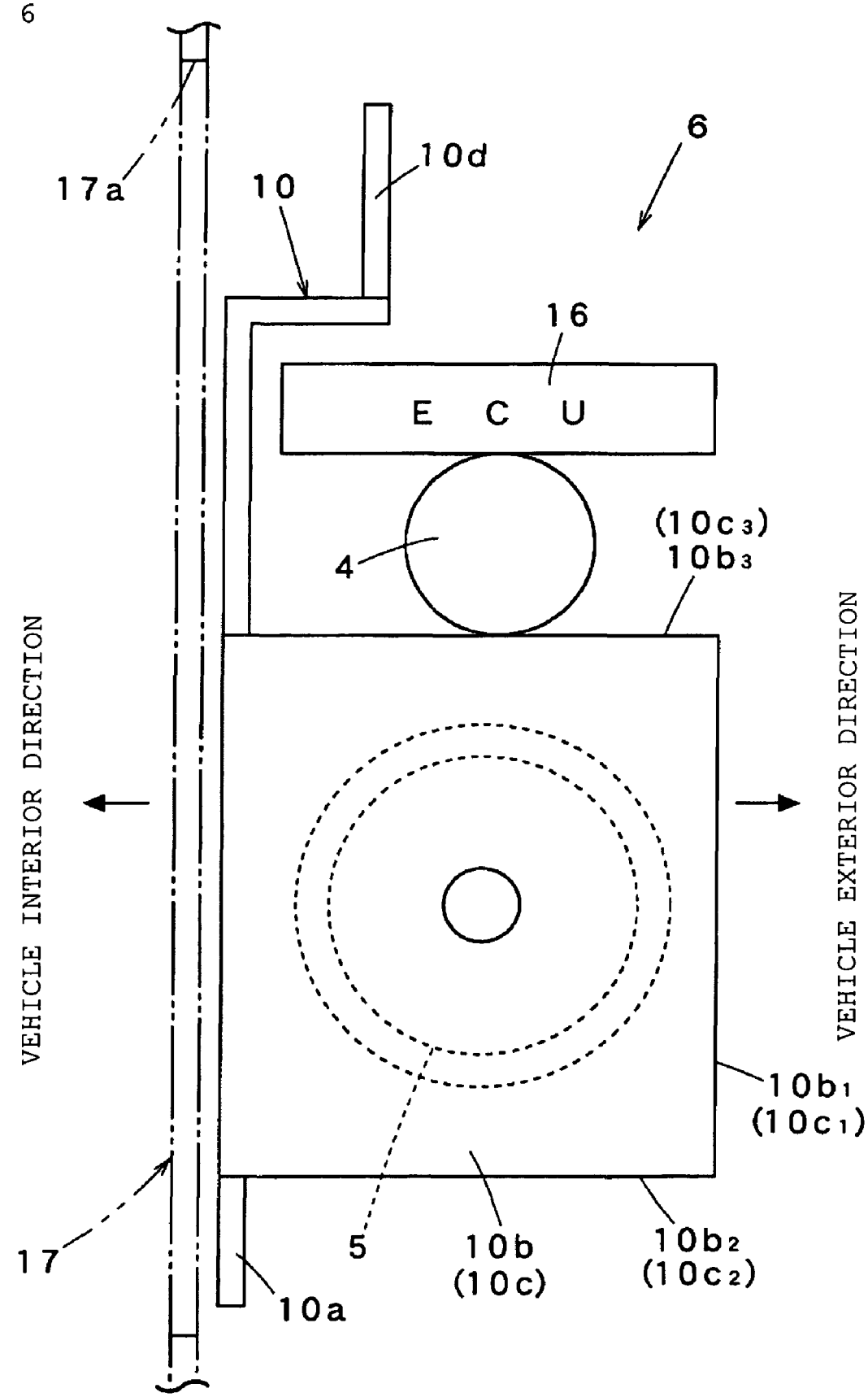
FIG. 6 is a schematic view illustrating a seat belt retractor according to another exemplary embodiment.

FIG. 6 is a schematic view illustrating another exemplary embodiment of the seat belt retractor. Although the ECU 16 is mounted between the upper edges 10b3 and 10c3 of the side walls 10b and 10c and the motor 4 is fixed to the upper surface of the case of the ECU 16 in the exemplary embodiment of FIG. 3, the motor 4 may be mounted between the upper edges 10b3 and 10c3 and the ECU 16 may be fixed to an upper surface of the case of the motor 4 according to other exemplary embodiments. Other construction, operation, and advantages of the seat belt retractor may be substantially similar to those of the exemplary embodiment illustrated in FIG. 5.

The seat belt retractor of the present disclosure is not limited to the above-described exemplary embodiments. For example, the seat belt retractor can be configured to perform only the retracting operation for the seat belt using a driving force of the motor or can be configured to perform only the withdrawing operation for the seat belt. The seat belt retractor may be configured to perform at least one of the retracting and withdrawing operations for the seat belt.

Each of the described respective seat belt retractors illustrated in FIGS. 1-8 can be used in a three-point type seat belt apparatus 1, as illustrated in FIG. 7 for example.

The seat belt retractor 6 may be compact and may be assembled into a narrow space such as the inner space of the center pillar. An inner space of the vehicle interior of a motor vehicle may be less wastefully occupied by the seat belt retractor 6 even when the seat belt retractor 6 includes the motor 4 and the ECU 16 is provided. The restraining capability for an occupant can be adjusted by a belt tension control for the seat belt 3 with the motor while maintaining occupant comfort.

The seat belt retractor and seat belt apparatus can be used to perform at least one of retracting and withdrawing operations for the seat belt by controlling rotation of a spool with a motor.

The priority application, Japanese Patent Application No. 2007-221360, filed Aug. 28, 2007 including the specification, drawings, claims and abstract, is incorporated herein by reference in its entirety.

It is important to note that the arrangements of the seat belt retractor, as shown, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Many modifications are possible without departing from the scope of the invention unless specifically recited in the claims. Accordingly, all such modifications are intended to be included within the scope of the present disclosure as described herein. The order or sequence of any process or method steps may be varied or re-sequenced according to alternative embodiments. Other substitutions, modifications, changes, and/or omissions may be made in the design, operating conditions and arrangement of the preferred and other exemplary embodiments without departing from the exemplary embodiments of the present disclosure as expressed herein.

What is claimed is:

1. A seat belt retractor comprising:
   a frame, the frame comprising:
      a back plate, and
      a side wall protruding from each of multiple side edges of the back plate;
   a spool supported by the frame and configured to rotate and wind a seat belt;
   a motor configured to rotate the spool; and
   an electronic control unit configured to drive and control the motor,
   wherein the electronic control unit is fixed to the motor, and
   wherein the electronic control unit and the motor are disposed above the side walls or below the side walls.

2. The seat belt retractor according to claim 1, wherein the electronic control unit is disposed below the lower edges of the side walls.

3. The seat belt retractor according to claim 2, wherein the electronic control unit is fixed to a lower surface of the motor.

4. The seat belt retractor according to claim 1, wherein the electronic control unit is disposed above the upper edges of the side walls.

5. The seat belt retractor according to claim 4, wherein the electronic control unit is fixed to an upper surface of the motor.

6. The seat belt retractor according to claim 4, wherein the electronic control unit is surrounded by the back plate, the side walls, and an upper portion of the frame such that the electronic control unit is protected from an external force.

7. A seat belt apparatus comprising:
   a seat belt retractor including a frame having a back plate and a side wall protruding from each of multiple side edges of the back plate;
   wherein the retractor further includes a spool supported by the frame and configured to rotate and wind a seat belt, a motor configured to rotate the spool in order to perform at least one of retracting and withdrawing operations for a seat belt, and an electronic control unit configured to drive and control the motor, wherein the electronic control unit is fixed to the motor and wherein the electronic control unit and the motor are disposed above the side walls or below the side walls;
   a tongue slidably supported by the seat belt; and
   a buckle with which the tongue is disengaged or engaged, wherein an occupant is restrained by the seat belt when the tongue is engaged with the buckle.

8. A seat belt retractor comprising:
   a frame, the frame comprising:
      a back plate, and
      a side wall protruding from each of multiple side edges of the back plate;
   a spool supported by the frame and configured to rotate and wind a seat belt;
   a motor configured to rotate the spool; and
   an electronic control unit configured to drive and control the motor,
   wherein the electronic control unit is fixed to the motor and wherein the electronic control unit and the motor are disposed above the side walls or below the side walls.

* * * * *